May 12, 1964   E. W. ISBEY ETAL   3,132,581
COLD PROCESS LAMINATION MACHINE
Filed May 13, 1963   2 Sheets-Sheet 1
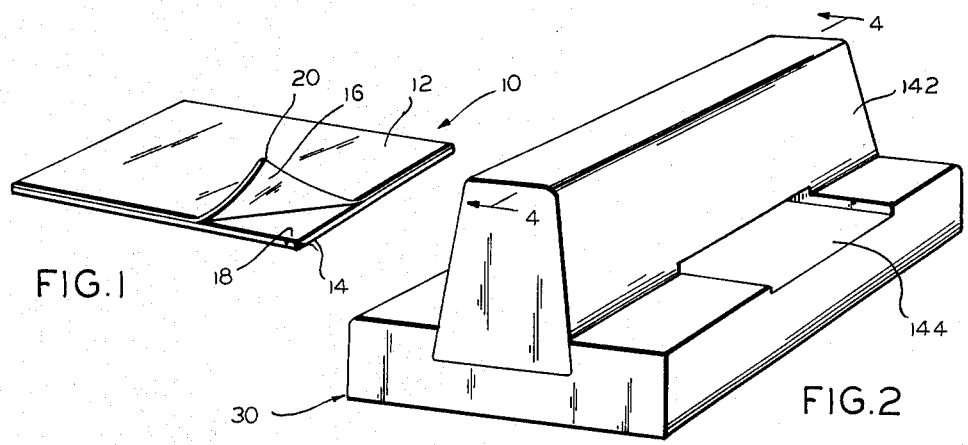
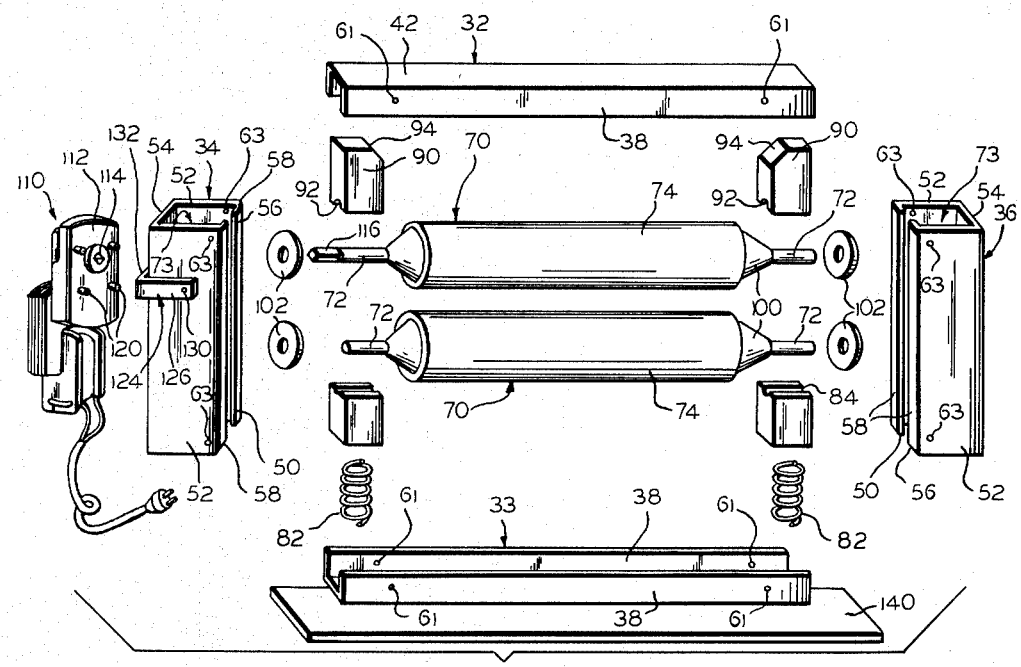
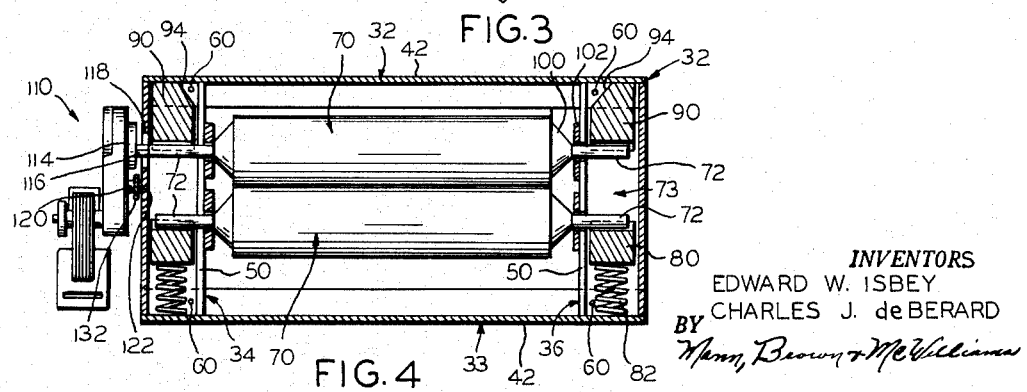
INVENTORS
EDWARD W. ISBEY
CHARLES J. de BERARD
BY Mann, Brown & McWilliams
ATTORNEYS

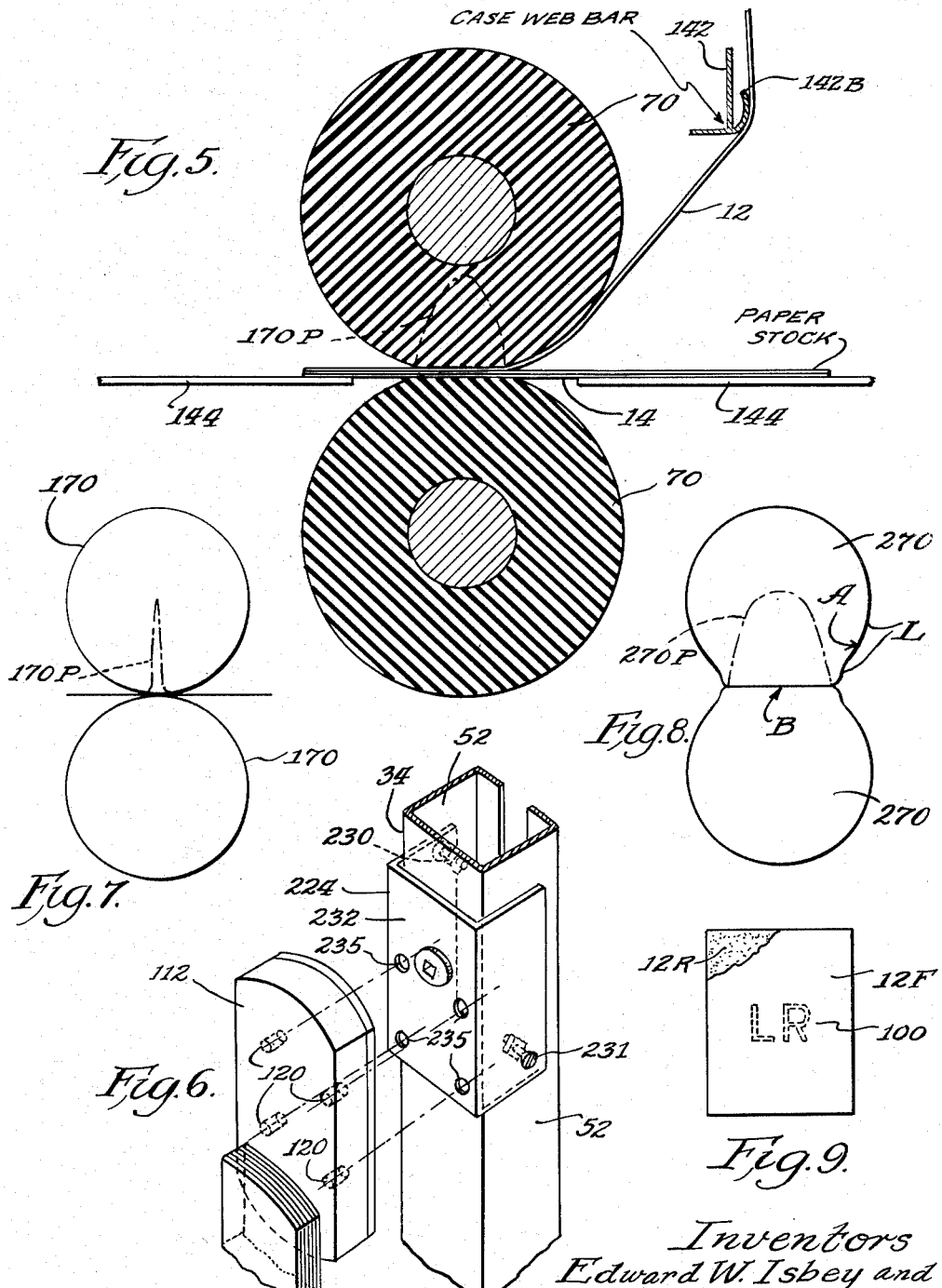

//  # United States Patent Office 3,132,581
Patented May 12, 1964

3,132,581
COLD PROCESS LAMINATION MACHINE
Edward W. Isbey, Chicago Heights, and Charles J. de Berard, Flossmoor, Ill., assignors to Best Plastic Products, Inc., a corporation of Illinois
Filed May 13, 1963, Ser. No. 280,062
13 Claims. (Cl. 100—171)

This application is filed as a continuation-in-part of copending application Serial No. 127,270, filed July 27, 1961, now abandoned and the disclosures of said application and of another copending application, Serial No. 152,501, filed November 15, 1961, now abandoned are specifically incorporated herein by this reference.

This invention relates to cold process lamination wherein an adhesively coated plastic sheet is to be intimately adhered to paper. In general, the difficulties and application requirements are most pronounced in the case of applying pressure sensitive laminates to paper sheets, particularly paper sheets of a thickness ranging to as low as 0.002 or 0.003 inch.

Pressure sensitive laminates are composed of a microfilm of plastic (such as acetate, vinyl, or a polyester resin such as Mylar) having a coating of a pressure sensitive adhesive of pliable consistency applied to its contact face. For ease in shipping, handling, and application, the plastic microfilm comes provided with a backing sheet, usually a layer of waxed kraft paper, protectively disposed against its contact face.

The success of a laminated product is judged on its crystal clarity, flatness and uniformity of bonding.

It has long been recognized that pressure roller application of laminates will adhere the plastic to the sheet that is to be protected but the questions of quality, permeability and suitability have not been effectively answered.

The principal object of the invention is to provide a cold process lamination machine capable of producing, consistently, a clear uniformly bonded, uniformly flat laminated product in black and white or color prints without loss of contrast.

Related objects of the invention are to provide a cold process lamination machine of this type that requires no special training or experience to operate, that is adapted for laminating a wide range of items, and that is inexpensive in manufacture, convenient in use, and efficient in operation.

Another object of the invention is to provide a method of laminating, useful particularly for making transparencies for projection purposes in the field of audio-visual education.

Generally speaking, to achieve a clear, uniformly bonded laminated product, a pair of resiliently distortable rollers are spring loaded against each other to provide opposing matched, flat contact faces defining a flat contact plane at the roll contact region. The machine has an entry shelf and a receiving shelf located on opposite sides of the roll contact region and providing sheet material support decks substantially coplanar with the contact plane defined by the rollers. Any appreciable misalignment of these three regions results in convexly or concavely curved laminated work.

In the preferred arrangement for handling thin paper stock, the lower roller is mounted as an idler while the upper roller is connected to a direct drive motor to operate as a drive roller. The motor driven upper roller engages the plastic laminate which thus bears the principal stresses applied, and since the plastic laminate better withstands this than does the thin paper stock, higher pressures and speed of operation are made possible with this particular arrangement.

A number of factors are now known to effect the uniformity and crystal clarity of bonding such as, the pressure acting between the rollers, the size and hardness of the rollers, and the roller speed. While the permissible speed may be increased by intensifying the pressure, a maximum pressure is determined by the strength of the sheet material that is to receive the laminate and more importantly by the tendency of the same to elongate locally or unevenly, thereby leading to wrinkling at higher pressures. High pressures frequently result in buckling, seaming, and folding of thin paper stock or other readily pliable mediums, particularly where the high pressure is applied through an unduly wide contact face, the added width of which exerts a pronounced stretching action on the sheet material.

To appreciate that critical relationships are involved, it is important to note that there must be great enough pressure and continuity of contact to insure activating the adhesive to flow and penetrate the fibres or pores of the paper stock, and to insure that air entrapped in these pores or fibres is forced out and ultimately completely expelled from the region between the sheets being laminated. The degree of hardness of the resilient body of roller material is also an important factor in achieving and maintaining the required critical relationships between pressure, speed, and contact face configuration. Where roller material is too hard, sufficient contact face area for expulsion of entrapped air cannot be developed within acceptable pressure ranges. Where roller material is too soft, excessive face area develops at workable pressure values and exerts excessive stretching action on the sheet material.

The various critical features known to exist with respect to speed, pressure and roller size and hardness, can be summarized by a time factor representative of the transit time through the contact faces and a stretch factor representative of the ratio of contact face width to roller diameter. The time factor must be great enough to allow for complete air expulsion and the stretch factor must be low enough to prevent stretching and wrinkling of the paper stock.

Other objects and advantages of the invention will become apparent during the course of the following description.

In the accompanying drawings forming a part of this specification, and in which like numerals are employed to designate like parts throughout the same;

FIG. 1 is a perspective view diagrammatic in nature illustrating the composite plastic sheeting material that this invention is conceived with;

FIG. 2 is a diagrammatic perspective view of the overall machine;

FIG. 3 is a diagrammatic exploded perspective view of the essential components of the machine;

FIG. 4 is a sectional view substantially along line 4—4 of FIG. 2;

FIG. 5 is an enlarged cross sectional view through the rollers;

FIG. 6 is an exploded perspective view of an alternative motor mounting arrangement;

FIG. 7 is a diagram of a hard roller arrangement for which the time factor becomes unacceptably low;

FIG. 8 is a diagram of a soft roller arrangement for which the stretch factor becomes unacceptably high; and FIG. 9 is a face view of a transparency lamination produced on laminating apparatus in accordance with this invention.

A typical example of a pressure sensitive laminate is shown generally at 10, FIG. 1, as comprising a microfilm sheet 12 of plastic such as acetate, vinyl or a polyester resin such as Mylar having a pressure sensitive adhesive disposed uniformly upon its contact face 16, which engages a backing sheet 14, that may consist of a layer of waxed kraft paper to protect the plastic sheet 12, for ease in shipping, handling and application and to facilitate separation of the plastic sheet 12 from the backing sheet 14, preparatory to laminating. One of the corners 20 of the plastic sheet 12 is shown separated from the waxed face 18 of the backing sheet 14.

The cold process laminating machine of this invention is designated generally at 30 in FIG. 2 and is generally used for laminating protective plastic cover sheets 12 onto thin sheets of paper stock of a thickness ranging to as low as .003". The machine is useful for laminating of cards, photographs, magazine pages, maps and similar items.

The details of one embodiment of the machine are best shown in FIGS. 3, 4 and 5. The machine incorporates a generally rectangular framework having a vertically spaced pair of elongated retainers, 32 and 33, and a horizontally spaced pair of tracks, 34 and 36, connecting like ends of the retainers, 32 and 33. Each of the retainers, 32 and 33 is illustrated as a one-piece sheet metal stamping of channel shaped cross section defined by spaced sidewalls 38 integrally connected by a central closure wall 42. Each of the tracks 34 and 36 defines a vertical guide way and is illustrated here as a sheet-metal stamping of generally hollow quadrilateral transverse cross-sectional configuration having a vertical slot, 50, along its inner face. Each track includes spaced sidewalls 52, a rear wall 54, connecting the sidewalls and a front wall 56, interrupted by the slot 50, to define edge regions 58, bordering the slot 50.

In the arrangement illustrated herein, in FIGS. 3 and 4, for purposes of disclosure, each of the tracks, 34 and 36, is proportioned to enable its ends to fit within the retainers, 32 and 33, respectively, with bolts shown at 60 in FIG. 4, projecting through aligned holes 61 in the retainers, and 63 in the tracks, to secure the parts and define a rigid framing structure.

A pair of rollers 70 are mounted to extend in parallel adjacent relation between the tracks 34 and 36 and each roller is equipped with an axle 72 at each end that projects through the slot 50 and into the lengthwise guideway 73 of the corresponding track. Each of the rollers 70 is preferably provided with a cylindrical contact surface 74 having a resiliently deformable characteristic provided by a resilient material such as natural or synthetic rubber. This construction permits limited deformation of the contact surfaces when the rollers 70 are pressed together. In the form illustrated, the contact surfaces 74 are formed by synthetic rubber sheeting having a durometer in the range 45/65.

As indicated in FIG. 4, the rollers 70 are disposed horizontally and are arranged in vertically offset superposed relation in the machine 30, and the axles 72 of the lower roller 70 are journalled in plain bearing blocks 80 that are received within the track guideways 73 and that are supported by compression springs 82 which seat against the closure wall 42 of the lower retainer 33.

Each of the bearing blocks 80 is formed to provide a substantially semi-circular recess 84 in which an axle may rotate and each block is shaped to match the configuration of the track guideways 73, with a loose enough fit being employed so that the blocks 80 are freely movable along the tracks.

At the top of the device, plain bearing blocks 90 are interposed between the axles 74 of the upper roller 70 and the closure wall 42 of the retainer 32 to bear directly against the closure wall 42 of the upper retainer 32 as indicated in FIG. 4. Each of the blocks 90 is formed with a semi-circular recess 92 that is complementary to and receives the corresponding axle 72 of the top roller 70. Each of the blocks 90 is shaped to match the configuration of the track guideways 73 with a sufficiently loose fit being employed so that the blocks 90 are freely movable along the tracks.

The blocks 90 in the illustrated embodiment are chamfered as at 94 to accommodate the upper bolts 60. Conventional pillow block bearings may be employed in place of the bearings illustrated herein.

The rollers 70 terminate in frusto-conical surfaces 100, and a thrust washer 102 is received over each axle 72 for location between the adjacent track and the frusto-conical surface 100, as shown in FIG. 4.

In the illustrated embodiment of the invention, the top roller 70 is driven by a suitable electric motor generally indicated at 110. Since the construction of motor 110 forms no part of the present invention, it is only diagrammatically illustrated, but the form employed in connection with this invention a frame structure 112 that supports the motor components and journals a socket component 114 in which is received a squared elongated end extension 116 of the axle 72 of the top roller 70, which projects through an opening 118 (see FIG. 4) formed in wall 54 of track 34.

In the illustrated embodiment, the motor frame 112 is provided with a pair of screw sockets 120 to receive a pair of flat headed screws 122 that secure same to the U-shaped bracket 124 that is secured at its ends 126 to the walls 52 of column member 34 by pins 130. In this embodiment of the invention, the motor frame 112 is thus secured to the web 132 of bracket member 124.

When the components have been assembled in the manner indicated in FIG. 4, the resulting subassembly may be applied to a base plate 140 (see FIG. 3) which may be fixed in any suitable manner to the lower retainer 33, and the whole is mounted in any suitable manner within a protecting housing 142 (see FIG. 2). Housing 142 is preferably formed with identical feedways 144 on each side thereof (only one is shown) that are vertically aligned with the contacting portions of roller surfaces 74 to define entry and receiving shelves that are coplanar.

The several components of machine 30 that are shown in FIG. 3, are proportioned and arranged so that when assembled in the manner indicated in FIG. 4, the resilient bodies of the rollers 70 have opposing faces thereon contacting and correspondingly deformed to present substantially flat contact faces of matched size and configuration. As best seen in FIG. 5, the entry and receiving shelves 144 are aligned and located to support sheet material for movement in the plane of these faces and insure against curling of the laminated product as it enters and leaves the machine.

In FIG. 6 an alternative U-shaped bracket 224 is shown for mounting the motor frame 112 to the column 34. A pin 230 at the top of one side wall of the bracket 224 is anchored in the corresponding side wall 52 of the column and a second pin 231 at the bottom of the other side wall of the bracket 224 is anchored to the other side wall 52 of the column 34. No pivoting about the pins 230 and 231 is provided but the inherent flexibility of the bracket 224 and its spaced mounting pins accommodates limited adaptive movement of the bracket web 232 relative to the column 34. Mounting holes 235 are provided in the web 232 to register with screw sockets 120 in the frame 112 and the remainder of the assembly is like that shown in FIG. 3.

One important feature requisite to the successful practice of cold process lamination is that the rollers 70 be matched for providing substantially identical opposing contact face regions when loaded by the action of the compression springs 60. Each roller 70 consists of a central shaft enveloped by an annular body of resilient material arranged uniformly about the shaft and intimately fixed thereon. In the original form of the machine, rollers were employed which had a diameter of 2¼", and which have a resilient body having a radial thickness of ⅝" comprised of 45 durometer Buna S rubber. It is presently preferred to utilize rollers having a diameter of 2" or 2¼", and which have a resilient body having a radial thickness dimension of ⅜" comprised of 55/65 durometer Buna S rubber with minimum microwave surface. This specific disclosure is given to illustrate the general characteristics required for the rollers for achieving the required contact face area at proper pressure levels. Some variation from these figures is contemplated, as will become more clear, but in general rollers having these characteristics are required for successful cold process lamination machines.

There are a number of combinations of roller diameter and roller surface hardness characteristic for achieving a desired contact face width for a given value of contact face pressure;

A. For a selected contact face width and pressure, it is possible to select a soft surfaced roller of small diameter and a hard surfaced roller of large diameter that are equivalent, and;

B. A given surface hardness condition may be achieved by utilizing a large diameter shaft covered by a thin layer of relatively soft rubber or by using a smaller diameter shaft covered by a thick layer of relatively hard rubber. With these general considerations in mind, the action of the opposed flat contact faces of the rollers in adhering the plastic cover sheet to the paper worksheet may be examined.

However, before considering the contact face concepts of this invention, it is useful to analyze the action of two extremes of contact face conditions. One extreme is provided by a pair of extremely hard-faced rollers 170 (see FIG. 7) such as of wood or steel which effectively define a line contact therebetween. In this instance, the pressure distribution pattern acting upon sheet material moving between the rollers is a sharp pip 170P and the resulting laminated product is unacceptable as there is considerable air entrapped, giving a generally foggy appearance. This result is explainable because air is entrapped in the pores of the paper stock, air films adhere to the surfaces of the sheets and finally air occupies the space between the sheets being brought together by the rollers. A finite time is required to displace the air from the pores of the paper and to expel it from between the sheets, but the pressure build-up characteristic in the case of the hard rollers 170 is too sharp to afford any appreciable time interval. Therefore, complete expulsion of air is not achieved and the entrapped air mars the final product. The time interval is dependent upon the roller surface speed and the contact face width.

At the other extreme, a pair of extremely soft faced rubber rollers 270, when subjected to pressures within an acceptable working range, will develop a wide contact face area having a pressure distribution pattern 270P somewhat like that shown in FIG. 8. Where there exists a wide contact face area relative to roller diameter, the material at the surface of the rubber is distorted substantially from its normal circular periphery. The extent of the distortion increases as one moves from the point A to the point B illustrated in the roller configuration diagrammed in FIG. 8.

If one considers the normal circular configuration of an unstressed roller and observes a pair of lines directed axially on the roller surface, it will be recognized that as the region defined between these lines moves from the point A to the point B, it undergoes successively greater distortion and in effect extends or expands to thereby spread these lines apart. This expansive action at the contact face of a rubber body under stress is an inherent characteristic of pressure loaded rollers and in a laminating operation results in a corresponding stretching of the material being fed by the roller. Surface distortion of the roller may be designated by a stretch factor that depends upon the ratio of the contact face width to the roller diameter.

In general, the greater the stretch factor ratio, the greater the surface distortion of the roller, and hence, the greater the stretching force for a given pressure. At any effective pressures, the stretching forces can exceed the strength of the paper and if the stretching of the paper is too great, wrinkling and buckling result. Tests using 1¼" rollers covered with a ⅜" thick layer of rubber of 20 durometer, produced laminated products characterized by buckling and wrinkling at high pressure or marred by air entrapment at low pressure.

Effective cold process laminating must allow adequate time for eliminating air and must therefore provide a gradual build-up of pressure over a contact face of limited width; limiting the width of the contact face, limits the surface distortion and stretching forces. The 2" and 2¼" diameter rollers, described previously herein, properly correlate the critical factors involved. They achieve a contact face width on the order of ¼ of an inch at an averaged pressure over the entire contact face of 20 p.s.i. and this enables operation at speeds of 90 surface inches per minute as a preferred value.

Thus the transit time through the contact face region at the preferred operating range is given by, $$\text{Transit Time} = \frac{\text{¼ inch}}{90 \text{ inch/min.}} \times \frac{60 \text{ sec.}}{\text{min.}} = \frac{15}{90} = \text{⅙ sec.}$$

By experiment, it was found that a speed of as much as 128 surface inches per minute could be employed, but at this range air entrapment becomes noticeable. This experiment gives a lower limit for the transit time through the contact face region. Thus, $$\text{Transit Time} = \frac{\text{¼ inch}}{128 \text{ inch/min.}} \times \frac{60 \text{ sec.}}{\text{min.}} = \frac{15}{128} \text{ sec.} = \text{⅛ sec.}$$

A lamination is normally performed in the following fashion when a plastic facing sheet is to be applied to a sheet of paper stock. The laminate comprising the plastic sheet 12 and the backing sheet 14 is nipped into the rolls with the backing sheet 14 down. The plastic sheet 12 is peeled free of the backing sheet from its free trailing end towards its nipped end, with the plastic sheet being swung up over the machine cover. The paper stock is then inserted in proper registry between these sheets at the opened nip and the lamination is carried out progressively while the trailing portion of the plastic sheet is held above the paper stock as the material feeds into the rollers. For this purpose the machine cover housing 142 is fitted with a horizontal guide bar 142B (see FIG. 5) of vertically curving configuration and located at a position to insure that when the plastic sheet 12 is trained therearound, its approach section will contact the upper roller at a lower portion of its downwardly sweeping periphery. This relationship enables initial application of the sheet portions to occur entirely under the control of the rollers and in fact enables the upper roller to establish desired smoothing of the plastic sheet immediately in advance of its application.

Normally, the plastic sheet 12 and its backing sheet 14 are slightly larger than the paper stock and the edge regions of the plastic sheet are resealed to the edge regions of the backing sheet. A simple edge trimming operation may then be performed to free the laminate from its backing sheet.

The action of the opposed flat contact faces of the rollers in adhering the plastic cover sheet to the paper worksheet is important to the attainment of acceptable end products. As any given region of the laminate approaches the contact faces and moves progressively therethrough, the roller pressure acting to adhere the sheets increases gradually from the point of initial contact up to a maximum at the central region of the contact faces and thereafter pressure falls off gradually. An assumed pressure plot is shown at 170P in FIG. 5.

It has been determined that the pressure acting between the rollers determines the time required for achieving uniform activation of the adhesive and for achieving substantially complete expulsion of air. Where the pressure is increased, it becomes possible to operate at increased speeds and, correspondingly, lower pressures can be accommodated by operation at lower speeds. It should be noted that where the pressure value is to be changed, without however changing the roller, the resultant contact face area increases. In general with the 2″ rollers of the type described herein, a pressure change from 20 p.s.i. to 33 p.s.i. develops a contact face width range of from ¼″ to ⁹⁄₃₂″. Thus, with the preferred arrangement, the stretch factor does not become appreciable.

Thus, a maximum limit of a stretch ratio factor is defined by—

$$\text{Stretch Ratio} = \frac{7/16}{2\frac{1}{4}} = 7/36 \text{ or approximately } 1/5$$

while a preferred range is given by—

$$\text{Stretch Ratio} = \frac{1/4}{2} = 1/8$$

and $$\text{Stretch Ratio} = \frac{1/4}{2\frac{1}{4}} = 1/9$$

The maximum pressure that may be used is limited by virtue of the fact that the paper stock breaks down when subjected to high compression. Danger of breakdown of the paper stock is however, to a large extent avoided by the progressive increase of the pressure as applied by the flat contact faces. Where extremely narrow width contact faces are employed, the pressure buildup is so rapid that breakdown of the sheet material can occur at lower values of pressure.

Finally, in summary of this discussion, it should be noted that the preferred operating arrangement for a general purpose office laminating machine is a speed of approximately 90 surface inches per minute, which involves a pressure of 20 p.s.i. and a contact face of ¼″ width, these values being found suitable where the roller diameter is 2 or 2¼ inches and has a ⅜″ layer of resilient material of ⁵⁵⁄₆₅ durometer hardness.

A transparency suitable for projection in conventional audio-visual projection equipment is shown in FIG. 9 as a transparent front plastic sheet 12F and a rear plastic sheet 12R intimately adhered throughout their overlying portions by a transparent film of adhesive disposed therebetween. These plastic sheets are of the type disclosed herein for application by the cold process laminating technique of this invention, and in the product of FIG. 9, an image, designated generally at 100, is formed by ink deposits acquired on the contact face of the front sheet 12F by transfer from any inked sheet such as a magazine page, a newspaper page, or the like.

To produce a laminated transparency such as is shown in FIG. 9, a printed sheet preferably of clay enameled paper stock is first processed through the laminating apparatus disclosed herein to adhere the adhesively coated contact face of the front plastic sheet 12F thereon in full surfaced uniformly bonded contact. The composite laminate thus formed, is immersed in a solvent (water is usually sufficient) for several minutes to condition the clay surface of the paper stock for separation from the front sheet 12F. As the paper stock is peeled off, the ink deposit originally defining the image on the paper stock adheres to the contact face to transfer the image to the plastic sheet 12F with full definition of its original clarity and with unbroken composition. The adhesively coated contact face of the rear sheet 12R is then applied to the contact face of the front sheet 12F by running the material through the lamination apparatus, and the resultant product is well-suited for projection through conventional projection equipment.

In providing the ultimate in transparencies on the laminating apparatus shown herein, it is preferred to use a roller of 2 inches or 2¼ inches in diameter and 55/65 durometer hardness loaded to an average pressure distribution across its contact face of about 33 p.s.i. and driven at a surface speed of 40 to 45 surface inches per minute. At these values, crystal clarity of ink deposition is achieved and the water immersion period may be on the order of 5 to 10 minutes. It is possible to operate the same apparatus at a pressure value of 20 p.s.i. and 80 to 90 surface inches per minute but the interval must then increase to one hour or more and the clarity of definition and completeness of composition of the transferred ink image may be reduced somewhat.

What is claimed is:

1. Apparatus for laminating a plastic sheet onto a thin paper sheet by cold process pressure activation of adhesive coating material carried on a contact face of the plastic sheet for adherence to the paper sheet and comprising framing structure providing parallel spaced apart vertical tracks having corresponding lengthwise guideways, a separate stationary bearing in the lower end of each guideway, first and second superposed laminating rollers extending in parallel relation between said tracks, first means in each guideway providing a pair of aligned spaced apart bearings conjointly mounting one of said rollers to rotate about its central axis, second means in each guideway providing a pair of aligned spaced apart bearings conjointly mounting the other of said rollers to rotate about its central axis, each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio in the range of ⅑ to ⅛ at an average pressure over said face of 20 p.s.i., resilient means on said framing structure biasing the bearings of each guideway together to hold the normally cylindrical surfaces of said superposed rollers in deformed engagement at a force value that provides matched opposed contact faces, each having a width relative to roller diameter defining a ratio that ranges up to about ⅕, said contact faces having a sheet entry region along one edge and a sheet exit region along the opposite edge, said framing structure having entry and exit shelves in flanking relation to said superposed rollers to support and locate sheet material substantially at the elevation of and in the plane of said contact faces, and means on said framing structure for driving one of said rollers at a surface speed related to contact face width to provide a transit time through said faces of at least ⅛ of a second.

2. Apparatus for laminating a plastic sheet onto a thin paper sheet by cold process pressure activation of adhesive coating material carried on a contact face of the plastic sheet for adherence to the paper sheet and comprising framing structure providing parallel spaced apart vertical tracks having corresponding lengthwise guideways, a separate stationary bearing in the lower end of each guideway, first and second superposed laminating rollers extending in parallel relation between said tracks, first means in each guideway providing a pair of aligned spaced apart bearings conjointly mounting one of said rollers to rotate about its central axis, second means in each guideway providing a pair of aligned spaced apart bearings conjointly mounting the other of said rollers to rotate about its central axis, each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio of about ⅛ at an average pressure over said face of 20 p.s.i., resilient means on said framing structure biasing the bearings of each guideway together to hold the normally cylindrical surfaces of said superposed rollers in deformed engagement at a force value that provides matched opposed contact faces, each having a width relative to roller diameter defining a ratio of about ⅕, said contact faces having a sheet entry region along one edge and a sheet axis region along the opposite edge, said framing structure having entry and exit shelves in flanking relation to said rollers to support and locate sheet material at the elevation of and in the plane of said contact faces, and means on said framing structure for driving one of said superposed rollers at a surface speed related to contact face width to provide a transit time through said faces of at least 1/8 of a second.

3. Apparatus for laminating a plastic sheet onto a thin sheet of paper stock by cold process pressure activation of adhesive coating material carried on a contact face of the plastic sheet for adherence to the paper sheet and comprising framing structure providing parallel spaced apart vertical tracks having corresponding lengthwise guideways, first and second superposed laminating rollers extending in parallel relation between said tracks, first means in each guideway providing a pair of aligned spaced apart bearings conjointly mounting one of said rollers, second means in each guideway providing a pair of aligned spaced apart bearings conjointly mounting the other of said rollers, each roller having a body of resiliently deformable material uniformly arranged about its axis of rotation and normally presenting a cylindrical exterior surface having a surface hardness characteristic and radius of curvature such that, when each said roller is loaded radially against a roller of substantially matched configuration and surface hardness characteristic, each said roller presents a flat contact face having a width in the range of 1/4 to 3/8 inch at an average pressure over said face of 20 p.s.i., resilient means on said framing structure biasing the bearings of each guideway together to hold the normally cylindrical surfaces of said superposed rollers in deformed engagement at a force value that provides matched opposed contact faces, each of a width in the range of 1/4 to 3/8 inch, said contact faces having a sheet entry region along one edge and a sheet exit region along the opposite edge, said framing structure having entry and exit support decks in flanking relation to said superposed rollers to support and locate sheet material at the elevation of and in the plane of said contact faces, and means on said framing structure for driving one of said rollers at a surface speed relative to contact face width to provide a transit time through said faces of about 3/16 of a second.

4. A cold process pressure activating plastic lamination machine comprising a pair of channel-shaped retainer members having like sides open and mounted in spaced apart parallel relation with their open sides facing each other, tracks positioned between like ends of said retainer members and cooperatively providing coplanar spaced apart parallel guideways, a pair of rollers positioned in parallel side-by-side relation between said tracks for contacting engagement at the juxtaposed sides thereof, and disposed in alignment with the plane of said guideways, each of said rollers being formed with a resilient cylindrical surface and each including an axle element at each end thereof, bearings positioned within each of said guideways and respectively engaging an axle element of the upper of said rollers at the side thereof which is diametrically opposite said contacting side thereof, further bearings positioned within each of said column members and respectively engaging an axle element of the lower of said rollers at the side thereof which is diametrically opposite said contacting side thereof, said bearings having a configuration transversely thereof that is substantially complementary to the inner transverse configuration of the respective guideways, said guideways opening towards each other to receive the respective axle elements, each roller having a body of resiliently deformable material uniformly arranged about its axis of rotation and normally presenting a cylindrical exterior surface having a surface hardness characteristic and radius of curvature such that, when each said roller is loaded radially against a roller of substantially matched configuration and surface hardness characteristic, each said roller presents a flat contact face having a width in the range of 1/4 to 3/8 inch at an average pressure over said face of 20 p.s.i., compression spring means interposed between the respective further bearing blocks and the adjacent retainer member, and acting to hold the normally cylindrical surfaces of said superposed rollers in deformed engagement at a force value that provides matched opposed contact faces, each of a width in the range of 1/4 to 3/8 inch, said contact faces having a sheet entry region along one edge and a sheet exit region along the opposite edge, said machine having entry and exit support decks in flanking relation to said superposed rollers to support and locate sheet material at the elevation of and in the plane of said contact faces, and means on said machine for driving one of said rollers at a surface speed relative to contact face width to provide a transit time through said faces of about 3/16 of a second.

5. The machine set forth in claim 4 wherein said last named means comprises electric motor means, a U-shaped bracket having a web and side arms, means connecting said side arms to opposite sides of one of said tracks to accommodate limited adaptive movement of said web relative to said tracks, said motor means being secured to the web of said bracket, said last named track being slotted adjacent said bracket, and means for coupling said motor means to the axle element of said one roller through the last mentioned slot of said one column member.

6. Apparatus for laminating a plastic sheet onto a thin paper sheet by cold process pressure activation of adhesive coating material carried on a contact face of the plastic sheet for adherence to the paper sheet and comprising framing structure providing substantially parallel spaced apart tracks having corresponding lengthwise guideways, first and second superposed laminating rollers extending in contacting relation between said guideways, first means in each guideway mounting one of said rollers to rotate about its central axis, second means in each guideway mounting the other of said rollers to rotate about its central axis, each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio in the range of 1/9 to 1/8 at an average pressure over said face of 20 p.s.i., means biasing said cylindrical surfaces of said superposed rollers together in deformed engagement to present said matched opposed contact faces thereon, and means on said framing structure for driving one of said superposed rollers at a surface speed related to contact face width to provide a transit time through said faces of about 1/8 of a second.

7. Apparatus for laminating a plastic sheet onto a thin paper sheet by cold process pressure activation of adhesive coating material carried on a contact face of the plastic sheet for adherence to the paper sheet and comprising framing structure providing substantially parallel spaced apart guideways, first and second superposed laminating rollers extending in parallel relation between said guideways, first bearing means in each guideway mounting one of said rollers to rotate about its central axis, second bearing means in each guideway mounting the other of said rollers to rotate about its central axis, each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio in the range of 1/9 to 1/8 at an average pressure over said face of 20 p.s.i., means biasing said cylindrical surfaces of said superposed rollers together in deformed engagement at a force value that provides said matched opposed contact faces, each having a width relative to roller diameter defining a ratio in the range of 1/9 to 1/8, and means on said framing structure for driving one of said superposed rollers at a surface speed related to contact face width to provide a transit time through said faces of about 1/6 of a second.

8. Apparatus for laminating a plastic sheet onto a thin paper sheet by cold process pressure activation of adhesive coating material carried on a contact face of the plastic sheet for adherence to the paper sheet and comprising framing structure providing substantial parallel spaced apart guideways, first and second superposed laminating rollers extending in parallel relation between said guideways, first bearing means in each guideway mounting one of said rollers to rotate about its central axis, second bearing means in each guideway mounting the other of said rollers to rotate about its central axis, each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio of less than 1/5 at an average pressure over said face of 20 p.s.i., means on said framing structure biasing the bearings of each guideway together to hold the normally cylindrical surfaces of said superposed rollers in deformed engagement and present said matched opposed contact faces thereon, said framing structure having shelf means in flanking relation to said rollers to support and locate sheet material at the elevation of and in the plane of said contact faces, said framing structure supporting a horizontal guide bar at a location above and in advance of said contact faces to enable a sheet, when engaged between said rollers and trained about said bar, to contact said upper roller at a lower position of its downwardly sweeping periphery, and means on said framing structure for driving one of said superposed rollers at a surface speed related to contact face width to provide a transit time through said faces of at least 1/8 of a second.

9. Apparatus for laminating a plastic sheet onto a thin paper sheet by cold process pressure activation of adhesive coating material carried on a contact face of the plastic sheet for adherence to the paper sheet and comprising rigid framing including side frame structures providing transversely spaced apart vertical guide structures, a pair of laminating rollers for mounting in relatively superposed supported relation between said frame structures, a first pair of bearings mounted for movement in transversely aligned relation along said guide structures and conjointly mounting one of said rollers to rotate about its central axis, a second pair of bearings mounted in transversely aligned relation at fixed positions on said side frame structures, to locate corresponding ones of said first and second pairs of bearings in spaced apart relation along a direction defined by the corresponding guide structure, said second pair of bearings conjointly mounting the other of said rollers to rotate about its central axis, each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio ranging up to about 1/5 at an average pressure over said face of 20 p.s.i., resilient means biasing said second pair of bearings toward said first pair of bearings to hold the normally cylindrical surfaces of said superposed rollers in deformed engagement at a force value that provides matched opposed contact faces thereon, each having a width relative to roller diameter defining a ratio of less than 1/5, and means on said rigid framing for driving one of said superposed rollers at a uniform surface speed, said uniform surface speed being related to contact face width to provide a transit time through said faces of at least 1/8 of a second.

10. Apparatus for laminating a plastic sheet onto a thin paper sheet by cold process pressure activation of adhesive coating material carried on a contact face of the plastic sheet for adherence to the paper sheet and comprising rigid framing including side frame structures providing transversely spaced apart vertical guide structures, a pair of laminating rollers for mounting in relatively superposed supported relation between said frame structures, a first pair of bearings mounted for movement in transversely aligned relation along said guide structures and conjointly mounting one of said rollers to rotate about its central axis, a second pair of bearings mounted in transversely aligned relation at fixed positions on said side frame structures to locate corresponding ones of said first and second pairs of bearings in spaced apart relation along a direction defined by the corresponding guide structure, said second pair of bearings conjointly mounting the other of said rollers to rotate about its central axis, each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio in the range of 1/9 to 1/8 at an average pressure over said face of 20 p.s.i., resilient means biasing said second pair of bearings towards said first pair of bearings to hold the normally cylindrical surfaces of said superposed rollers in deformed engagement at a force value that provides opposed contact faces thereon, each having a width relative to roller diameter defining a ratio ranging up to about 1/5, and means on said rigid framing for driving one of said superposed rollers at a uniform surface speed, said uniform surface speed being related to contact face width to provide a transit time through said faces of about 1/6 of a second.

11. Apparatus for laminating a plastic sheet onto a thin paper sheet by cold process pressure activation of adhesive coating material carried on a contact face of the plastic sheet for adherence to the paper sheet and comprising rigid framing including side frame structures providing transversely spaced apart vertical guide structures, a pair of laminating rollers for mounting in relatively superposed supported relation between said frame structures, a first pair of bearings mounted for movement in transversely aligned relation along said guide structures and conjointly mounting one of said rollers to rotate about its central axis, a second pair of bearings mounted in transversely aligned relation at fixed positions on said side frame structures to locate corresponding ones of said first and second pairs of bearings in spaced apart relation along a direction defined by the corresponding guide structure, said second pair of bearings conjointly mounting the other of said rollers to rotate about its central axis each roller having a body of resiliently deformable material uniformly arranged about its axis and normally presenting a cylindrical exterior surface having a surface hardness characteristic such that, when each said roller is loaded radially against a roller of substantially matched configuration and surface hardness characteristic, each said roller presents a flat contact face having a width relative to roller diameter defining a ratio in the range of 1/9 to 1/8 at an average pressure over said face of 20 p.s.i., resilient means biasing said second pair of bearings towards said first pair of bearings to hold the normally cylindrical surfaces of said superposed rollers in deformed engagement at a force value that provides opposed contact faces thereon, each having a width relative to roller diameter defining a ratio ranging up to about ⅛, said contact faces having a sheet entry region along one edge and a sheet exit region along the opposite edge, said rigid framing including entry and exit shelves in flanking relation to said rollers to engage sheet material during movement up to said entry region and during movement away from said exit region thereby to contact and train the sheet material generally along the plane of said contact faces, and means on said rigid framing for power driving one of said superposed rollers at a uniform surface speed, said uniform surface speed being related to contact face width to provide a transit time through said faces of at least ⅛ of a second.

12. Apparatus for laminating a plastic sheet onto a thin paper sheet by cold process pressure activation of adhesive coated material carried on a contact face of the plastic sheet for adherence to the paper sheet, comprising: framing structure providing substantially parallel spaced apart guide means; a pair of superposed laminating rollers extending in contacting relation between said guide means; bearing means in said guide means rotatably mounting said rollers, each of said rollers having a body of resiliently deformable material uniformly arranged about its axis and normally presenting a cylindrical exterior surface having a surface hardness characteristic such that when said rollers are urged radially against one another they provide a flat contact face which produces a lamination of a plastic sheet and a paper sheet having adhesive characteristics and air exhaustion characteristics substantially similar to a lamination consisting of a plastic sheet and a paper sheet produced by a pair of rollers which present a flat contact face having a width relative to roller diameter defining a ratio of ⅒ to ⅛ at an average pressure over said face of 20 p.s.i., and at a rotational surface speed so related to contact face-width as to provide a transit time therethrough of about ⅛ of a second; means biasing said cylindrical surfaces of said superposed rollers together to provide said flat contact face; and means for rotationally driving at least one of said superposed rollers.

13. Apparatus for laminating a transparent plastic sheet onto a thin paper sheet by cold process pressure activation of adhesive coating material carried on a contact face of the plastic sheet for adherence to the paper sheet, comprising: framing structure providing substantially parallel spaced apart guide means; a pair of superposed laminating rollers extending in contacting relation between said guide means; bearing means in said guide means rotationally mounting said rollers, each said roller having a body of resiliently deformable material uniformly arranged about its axis and normally presenting a cylindrical exterior surface having a surface hardness such that when said rollers are loaded radially one against the other, each said roller presents a matched flat contact face such that when a laminate of a plastic sheet and a paper sheet is passed between said rollers while rotating at proper speed sufficient time is allowed and proper pressure is applied so that substantially all entrapped air is forced out of and completely expelled from said laminate and proper adhesive contact is provided between said plastic sheet and paper sheet to give good transparency without elongating said paper locally and without wrinkling; means biasing said cylindrical surfaces of said superposed rollers together in deformed engagement to present said matched flat contact faces thereon; and means for driving said rollers at said proper speed.

References Cited in the file of this patent

UNITED STATES PATENTS

| | | |
|---|---|---|
| 997,342 | Thompson | July 11, 1911 |
| 1,628,203 | Stein | May 10, 1827 |
| 2,533,474 | Koch | Dec. 12, 1950 |
| 2,591,665 | Ayers | Apr. 8, 1952 |
| 2,611,720 | Van Dyck et al. | Sept. 23, 1952 |
| 2,643,475 | Klopfenstein | June 30, 1953 |
| 2,927,620 | Elliott | Mar. 8, 1960 |
| 2,944,587 | Newcomb | July 12, 1960 |
| 3,027,285 | Eisner et al. | Mar. 27, 1962 |
| 3,047,051 | Matveef | July 31, 1962 |
| 3,078,207 | Takahashi | Feb. 19, 1963 |
| 3,086,904 | Uhleen | Apr. 23, 1963 |

UNITED STATES PATENT OFFICE
CERTIFICATE OF CORRECTION

Patent No. 3,132,681    May 12, 1964

Edward W. Isbey et al.

It is hereby certified that error appears in the above numbered patent requiring correction and that the said Letters Patent should read as corrected below.

Column 9, line 1, for "axis" read -- exit --.

Signed and sealed this 8th day of September 1964.

(SEAL)
Attest:

ERNEST W. SWIDER
Attesting Officer

EDWARD J. BRENNER
Commissioner of Patents